(12) United States Patent
Landschaft et al.

(10) Patent No.: US 7,885,681 B2
(45) Date of Patent: Feb. 8, 2011

(54) METHOD OF USING MOBILE COMMUNICATIONS DEVICES FOR MONITORING PURPOSES AND A SYSTEM FOR IMPLEMENTATION THEREOF

(75) Inventors: Assaf Landschaft, Munich (DE); Gal Wohlstadter, Munich (DE); Gil Wohlstadter, Munich (DE)

(73) Assignee: Agere Systems Inc., Allentown, PA (US)

( * ) Notice: Subject to any disclaimer, the term of this patent is extended or adjusted under 35 U.S.C. 154(b) by 984 days.

(21) Appl. No.: 11/246,654

(22) Filed: Oct. 7, 2005

(65) Prior Publication Data

US 2007/0082700 A1    Apr. 12, 2007

(51) Int. Cl.
    *H04M 1/00*    (2006.01)
(52) U.S. Cl. .................. 455/550.1; 455/41.2; 455/68; 455/70
(58) Field of Classification Search ............. 455/550.1, 455/41.1, 41.2, 41.3, 68, 70, 95, 510
    See application file for complete search history.

(56) References Cited

U.S. PATENT DOCUMENTS

| | | | |
|---|---|---|---|
| 2003/0222819 A1* | 12/2003 | Karr et al. .................... | 342/457 |
| 2004/0023686 A1* | 2/2004 | King et al. ................ | 455/550.1 |
| 2004/0179100 A1* | 9/2004 | Ueyama ..................... | 348/152 |
| 2004/0257208 A1* | 12/2004 | Huang et al. ............. | 340/426.1 |
| 2006/0250476 A1* | 11/2006 | Silverbrook ................ | 347/108 |

* cited by examiner

Primary Examiner—Tuan H Nguyen

(57) ABSTRACT

Introduced is a method for using mobile communications devices for monitoring purposes. In one embodiment the method includes (1) a first mobile communications device to transmit a control signal to a second mobile communications device directing the second mobile communications device to capture an image with its camera and transmit the image to the first mobile communications device; and (2) displaying the image on a screen on the first mobile communications device.

32 Claims, 3 Drawing Sheets

METHOD OF USING MOBILE COMMUNICATIONS DEVICES FOR MONITORING PURPOSES AND A SYSTEM FOR IMPLEMENTATION THEREOF

TECHNICAL FIELD OF THE INVENTION

The present invention is directed, in general, to a monitoring system, and especially to a monitoring system utilizing mobile communications devices.

BACKGROUND OF THE INVENTION

Many different visual monitoring systems are currently in use, ranging from security surveillance systems to baby monitoring. A typical surveillance system uses a closed-circuit television system where a dedicated remote television camera transmits a view of the monitored area over a cable to a television monitor. The person doing the monitoring can then view the monitored area from a location remote from the camera location.

Video surveillance systems are also in use where wireless technology is used to monitor an off-site location. Such a system typically uses an on-site video camera to capture video images. The camera is operatively connected to a service hub where a video server converts the video images into wirelessly transmittable digital data that is transmitted via a wireless network to an off-site receiver. Similar systems are also used with security cameras that are connected to the Internet with software that allows a user to view such images with a mobile phone.

All of these systems are expensive, however, as well as being complicated to install and use. They typically require a dedicated data channel of the type provided by a cable that connects the cameras with a central device. Furthermore, these systems are usually inflexible because the cameras are installed at fixed locations using permanent mounts with the attendant permanent wiring.

Accordingly, what is needed in the art is an inexpensive and portable monitoring system that can be easily installed and operated.

SUMMARY OF THE INVENTION

To address the above-discussed deficiencies of the prior art, the present invention provides for a method of using mobile communications devices for monitoring purposes. In one embodiment, the method includes (1) a first mobile communications device to transmit a control signal to a second mobile communications device that directs the second mobile communications device to capture an image with its camera and transmit the image to the first mobile communications device; and (2) displaying the captured image on a screen on the first mobile communications device.

Thus the present invention permits a person to use mobile communications devices to set up a monitoring system. The inventive method permits a person to use one mobile communications device to control certain functions of another mobile communications device for monitoring purposes. For example, if a user wants to monitor a child the present invention allows the user to set up a mobile communications device, such as a handheld computer, with its built-in camera positioned to capture an image of the child. The user can then use his or her mobile phone to control the handheld computer. The mobile phone is used to send control instructions to the handheld computer ordering it, for example, to take a picture of the child a certain designated intervals and transmit such picture to the mobile telephone for display.

In one embodiment, the method provides for the control signal to be transmitted by a mobile message system. A variation of this embodiment provides for the mobile message system to be an SMS (Short Message Service) system.

A particularly useful feature of the present invention provides for a variety of different control signals to be transmitted. In one embodiment, the control signal directs the second mobile communications device to detect a time interval and to periodically capture and transmit an image at each lapse of such time interval. The method also provides for a variety of different control parameters to be transmitted for the purpose of configuring the second mobile communications device. For example, a control signal can be a trigger signal the receipt of which triggers the second mobile communications device to capture an image.

In one embodiment, the method provides for the second mobile communications device to transmit an image via a transmission medium selected from e-mail, multimedia message according to MMS (Multimedia Messaging System) standards and a video stream. Another embodiment provides for compressing the image.

An embodiment of the invention provides that the first mobile communications device and the second mobile communications device are connectable via a mobile communication network. In still another embodiment the method provides that the control signal includes an identification code.

A useful embodiment of the invention provides for the second mobile communications device to capture audio data and transmit it to the first mobile communications device. In yet still another embodiment, the method provides for the second communications device to detect movement in its camera's field of view and to capture an image in response to such movement. A particularly useful embodiment provides for the image to be a video sequence.

The invention also includes a monitoring system utilizing mobile communication devices that, in one embodiment, include (1) a first mobile communications device having a means for transmitting a control signal; and (2) a second mobile communications device having a means for receiving control signals and a camera for capturing an image in response to the control signals as well as the means for transmitting such image to the first communications device. An aspect of the invention provides for the adaptation of the monitoring system to receive control signals by means of a mobile messaging system. An additional feature of this embodiment provides for the mobile messaging system to be an SMS system.

In one embodiment of the monitoring system, the control signal is a trigger signal and the image constitutes either a single image or a video sequence transmitted in response to such trigger signal. In another embodiment, the control signal constitutes control parameters for the second mobile communications device system to automatically capture and transmit a single image or a video sequence. In still another embodiment, the monitoring system is configured so that the second mobile communications device can detect movement in the field of view of its camera and automatically capture and transmit a single image or a video sequence to the first communications device. In one embodiment, the monitoring system has a microphone associated with the second mobile communications device that captures audio data for transmission to the first mobile communications device. A useful embodiment provides for the monitoring system to have the image transmitted via e-mail or via a multimedia message in accordance with MMS standards.

In one embodiment the invention provides a first mobile communications device adapted to control a second mobile communications device where the device has (1) a controller for generating control signals; (2) a transmitter for transmitting the control signals to the second mobile communications device; (3) a receiver for receiving an image captured by the second mobile communication device; and (4) a display for displaying the image.

A useful embodiment provide for a digital storage medium, such as a microchip, that has electronically readable control instructions for controlling a mobile communications device that direct it to capture an image in response to a control signal from a controlling mobile communications device; and transmit the image to the controlling mobile communications device. Still another useful embodiment provides for a digital storage medium, such as a microchip, with electronically readable control instructions for controlling a mobile communications device that direct the mobile communications device to transmit control signals to a second mobile communication device; and receive and display an image captured by the second mobile communication device.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawing, in which.

DETAILED DESCRIPTION

Figure 1:
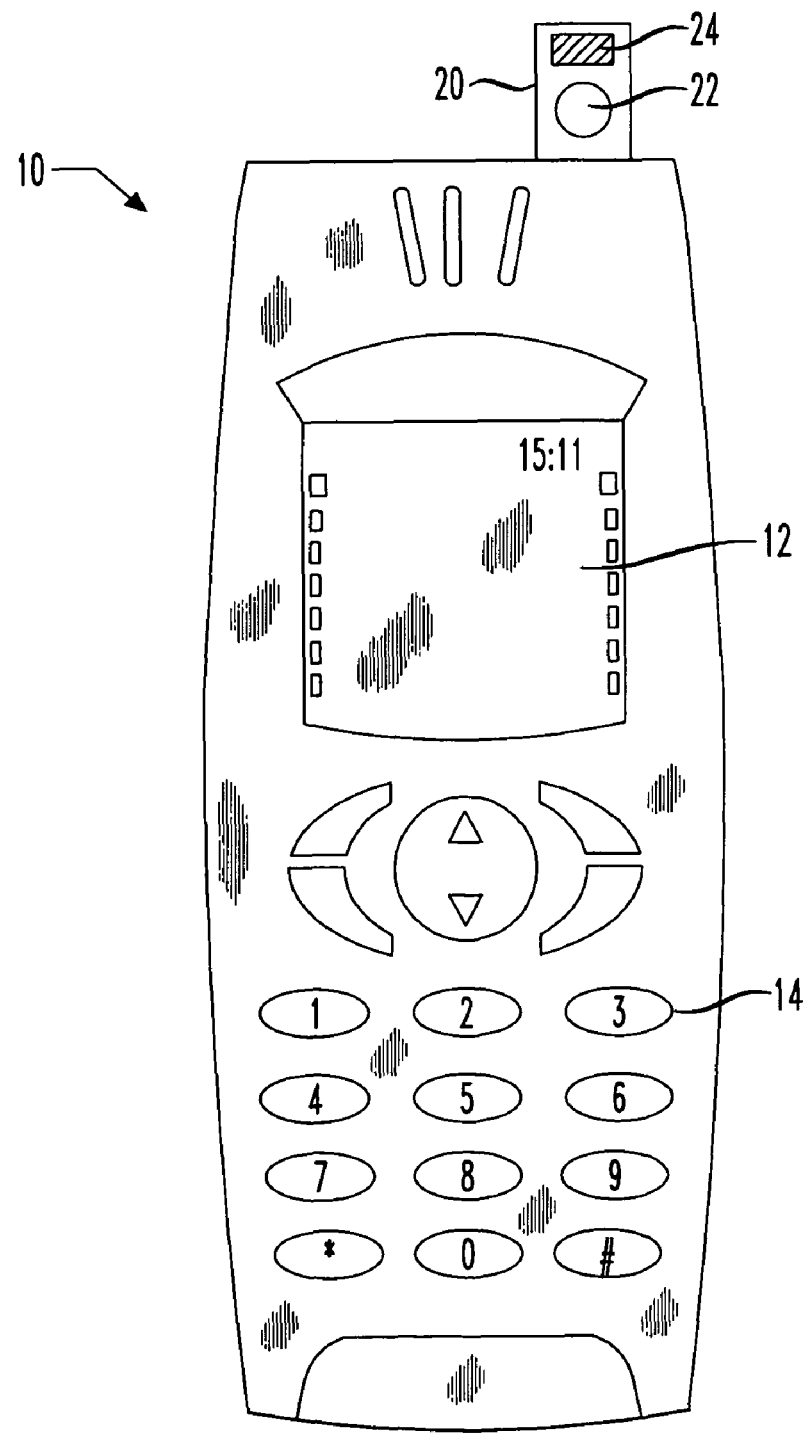
FIG. 1 illustrates a planar frontal view of an mobile communications device constructed in accordance with the present invention that can be used to capture an image in accordance with the present invention.

Before describing the FIGUREs, various aspects, embodiments and features of the invention will be described. The present invention sets forth a method for monitoring using one or more mobile communication devices. The method includes transmitting a control signal from a first mobile communication device to a second mobile communication device that captures an image or a video sequence with a camera and transmits such image to the first mobile communications device where it is displayed.

The present invention thus describes a method of using mobile communication devices that are configured to work together to perform the same monitoring functions as would be performed by a closed circuit camera system. One of the mobile communication devices, the first mobile communications device, serves as the controlling or master device and acts as a control center. The other mobile communications device, the second mobile communications device, serves as a slave device to the master device. The second mobile communications device is adapted to trigger its camera to capture either an image, which can be either a video image or a still image or picture when commanded to do so by a control signal received from the master or controlling device.

The controlling device has the functionality to remotely configure the slave device or devices by means of transmitted a control signal. The transmission of the control signal can be performed by a mobile messaging system, in particular using a short message service (SMS) system. To configure slave devices, the controlling device will send at least one configuration parameter. The controlling device and the slave devices, in one embodiment, are connected via a mobile communication network, such as a mobile communications network operated in accordance with GSM and/or UMTS standards.

If a UMTS or other 3G compliant mobile communications network is utilized, slave devices can be configured to capture video streams for transmission to the controlling device. A GSM network, even with the extended functionality provided by GPRS or similar technologies, typically does not provide video streaming capabilities.

In one embodiment, appropriate for use in a GSM network, the control signal designates a time interval for a configuration parameter. The slave device detects such parameter and automatically captures periodic single images at each such time interval and transmits them to the controlling device.

The controlling device can also send the control signal as a trigger signal, so that the slave device, when it detects the trigger signal, captures a single image or a video sequence. This trigger signal can also be used to start a continuous capturing process or for the specific on-demand capturing of a single image or video sequence. Of course, other parameters can be also be transmitted as part of the control signal, such as the duration of a video sequence or the number of images to be captured. The control signal can also include other types of control parameters or commands, such as a request for the slave device to zoom.

The captured image can be transmitted by as video stream when using a 3G compliant network that has video streaming capabilities, or, if still images or pictures are transmitted, by e-mail or a multimedia message using MMS. For practical purposes, the transmission of a captured image can be more efficiently accomplished by compressing the image using a compression algorithm according to JPEG or MPEG standards, or any other compression algorithm whether now known or subsequently developed.

In order to provide a level of security with respect to the invention and to prevent misuse or tampering, the control signal can also include an identification code to be compared with a reference code stored in the slave device's memory. This will permit only those control signals to be accepted that match the appropriate identification code. In the case of cellular or mobile phone type of mobile communications device, the controlling device can transmit a control signal using the controlling device's phone number as the identification code.

Parallel to an image being captured, audio data can also be captured and transmitted. Thus, the invention provides for the capture of audio data with a microphone by the slave device and the transmission of such audio data to the controlling device.

The capturing device can also be configured to capture an image in response to an internal trigger signal, such as when a movement is detected within the slave device's field of view. Thus, the inventive method includes the detection of a movement in the field of view of the slave device and the capture of either one or more still images or a video sequence in response to the detected movement.

In some instances, a single controlling device and a plurality of slave devices can be used as a monitoring system. Where a plurality of slave devices are used, each can be configured separately and independently by the controlling device.

The present invention can be implementing with mobile communications devices such as mobile phones, as well as any PDA or MDA style or type of device or any other mobile communications device whether now known or subsequently developed. Of course the easiest implementation of the present invention would most likely rely on existing mobile communications devices with a built-in camera. At present, most 2.5G mobile communications devices typically have built-in cameras adapted for the capture of still images only. On the other hand, 3G mobile communication devices will also support streaming video which permits the present invention to be utilized to provide the full functionality of a CCTV system. The terms 2.5G and 3G with respect to wireless technology stand for "second and a half generation" and "third generation" respectively. Usually, UMTS (Universal Mobile Telecommunication Service) is identified as 3G with enhanced multimedia functionality, broad bandwidth and high speed. 2.5G provides some of the benefits of 3G and commonly includes the GPRS protocol.

A mobile communication device equipped with a camera will typically also have the appropriate application programming interfaces (APIs) for controlling the camera. A mobile communications device will also typically have the appropriate APIs for transmitting and receiving still pictures or video streams via the GSM/GPRS or UMTS network, depending on the type of device. Therefore, the functionality provided by the present invention can be implemented in a mobile communications device by software that uses existing APIs. This permits a digital storage medium, in particular a microchip, to be within the intended scope of the present invention. Such a storage medium when inserted in a slave device will enable the device to execute electronically readable control instructions received as a control signal from a controlling mobile communication device directing it to capture an image and transmitting such image to the controlling mobile communication device.

A digital storage medium, in particular a microchip, to insert in the controlling device also lies within the scope of the present invention. Such a storage medium includes electronically readable control instructions adapted to execute the transmission of control signals to a second mobile communications device as a slave device and to receive and display image data captured by the slave device.

Turning now to FIG. 1, illustrated is a planar frontal view of a mobile communication device constructed in accordance with the present invention that can be used to capture an image in accordance with the present invention. Shown is a schematic view of a mobile phone 10, which is the type mobile communications device being utilized in accordance with the present invention, that is the capturing or slave device. To capture an image, the mobile phone 10 has a camera module 20 with a lens 22 and a flash 24. The illustrated mobile phone 10 also includes standard components such as a display 12 and a keypad 14. A mobile communication device, such as a mobile phone 10, utilized as a controlling device will also have similar components and will differ only with respect to the execution of the software application.

Figure 2:
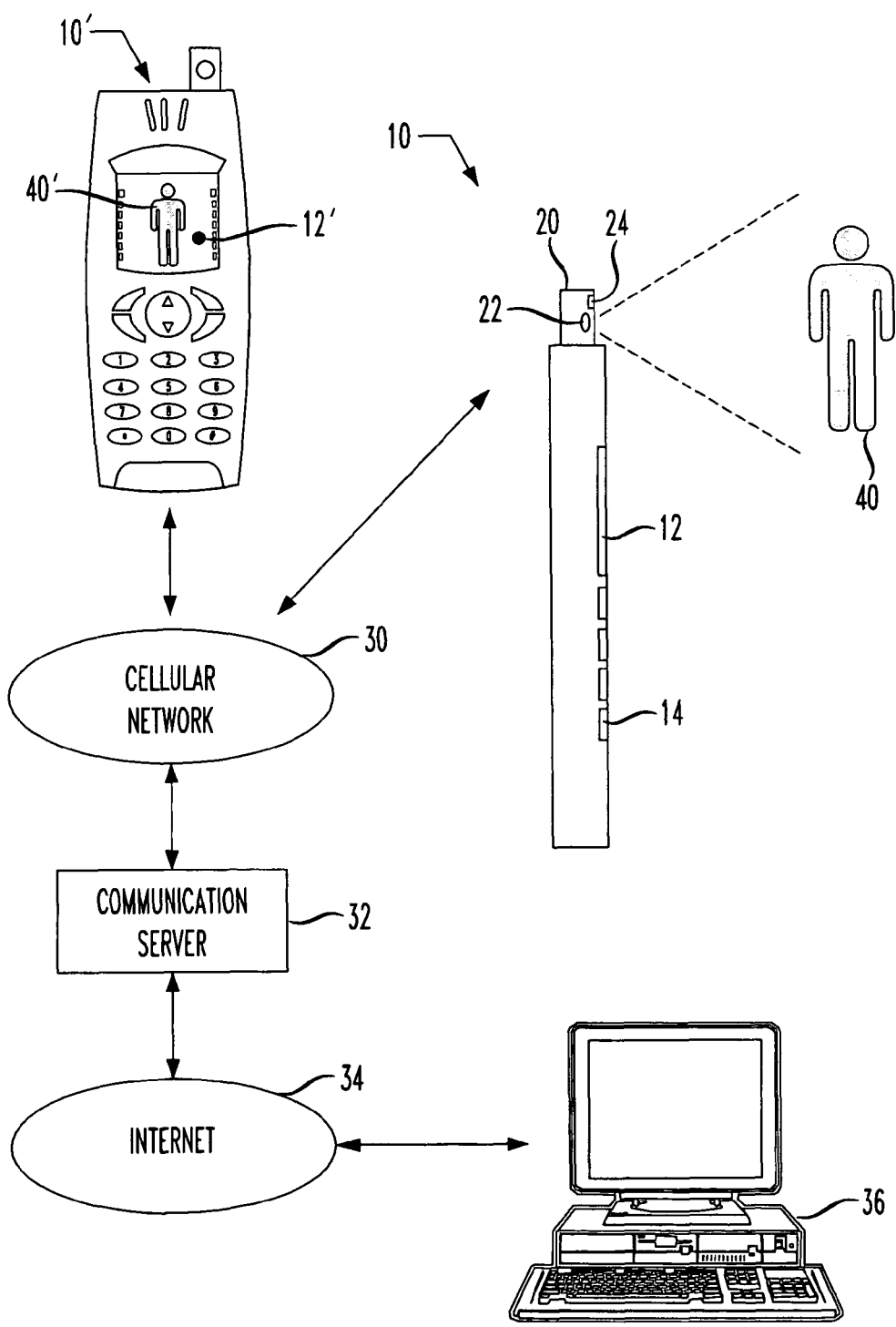
FIG. 2 illustrates flow chart of an embodiment of the present invention showing the use of a mobile communications device as a monitoring device.

Turning now to FIG. 2, illustrated is a flow chart of an embodiment of the present invention showing the use of a mobile communications device as a monitoring device. The mobile phone 10, illustrated in detail in FIG. 1, acts as a slave device and receives control signals via a cellular network 30. Control signals can be provided as a short message according to SMS standards over a cellular network 30 from a second mobile phone 10' acting as a controlling device.

The transmitted control signals are used to control the mobile phone 10 and thus define its behavior. Such control signal can include the appropriate configuration parameters for the mobile phone 10. Depending on such configuration parameters, the mobile phone 10 can, for example, be triggered to capture a single image once, be configured to periodically capture images with a given time interval or be configured to capture an image when it is triggered by an integrated movement or sound sensor serving as a trigger generator.

The mobile phone 10 captures an image of an object or person 40 by means of its integrated camera module 20. This captured image is then transmitted to the controlling mobile phone 10' where the image 40' is shown on a display 12'. The captured image can be transmitted, for example, by way of a multimedia message according to MMS standards or by an e-mail. If the network 30 is 3G compliant, the captured image can also be transmitted by way of a video stream, such as, for example, a video stream in accordance with MPEG-4 standards.

The intended scope of the present invention also includes a captured image to be transmitted via a cellular network 30, a communication server 32 and over the Internet 34 to a computer 36. This computer need not be a mobile communications device. The image can then be visualized on a monitor connected to the computer 36.

Figure 3:
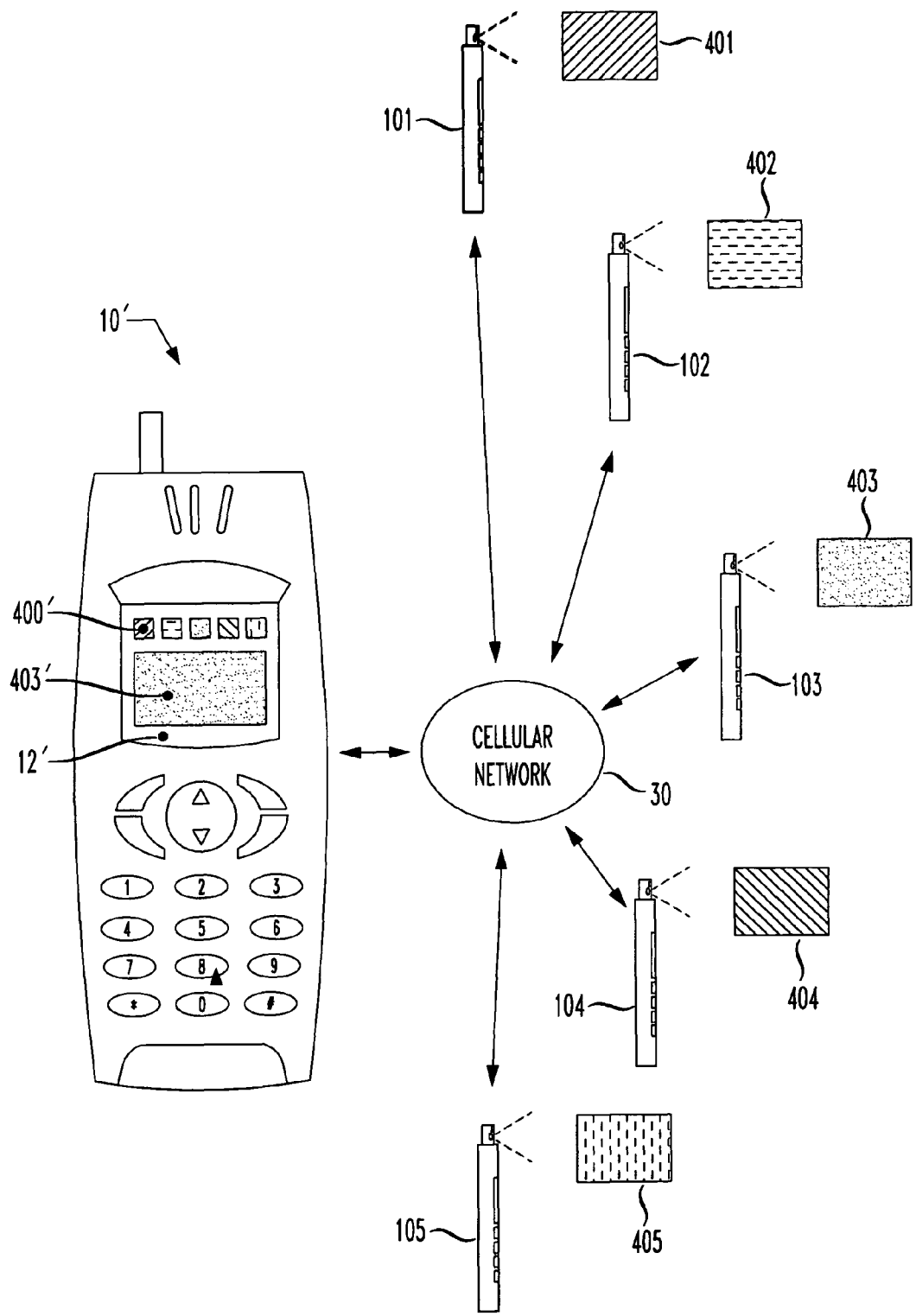
FIG. 3 illustrates a surveillance system constructed in accordance with the present invention where five mobile communications devices are used to capture images.

Turning now to FIG. 3, illustrated is a surveillance system constructed in accordance with the present invention where five mobile communications devices 101-105 are used to capture images. This illustrates how the present invention beneficially provides for an easy and flexible method of monitoring several different locations; thus, providing the functionality of a closed circuit camera system. Shown is a surveillance system made up of a controlling device 10' and five capturing devices 101 to 105, each viewing a different scene 401-405 at a different location. The capturing devices 101-105 act as slaves and the controlling device 10' acts as a master. The controlling device 10' can configure the slaves 101-105 via SMS or any presently known or subsequently developed mobile messaging system. The slaves 101-105 are placed at locations where the user would probably otherwise use closed circuit television cameras. If the network 30 is a GSM network, the functionality would be limited, as compared to a 3G network, to the transmission of still images periodically by the slaves 101-105. A UMTS network would provide a much broader band and provide the user a surveillance system with real-time video streams sent from the slaves 101-105 to the master 10'. An application to manage the slaves 101-105 on the controlling device 10', the master mobile phone 10', will show the status of each slave device 101-105 and enable the user to control them, such as, for example, by sending zoom instructions to a particular slave device 101-105. In the illustrated embodiment, the captured images of the various scenes 401-405 are transmitted to the controlling device 10' and shown on a display 12'. For example, when the user selects slave 103, an enlarged image 403' of scene 403 will be shown on display 12'.

It is apparent that the present invention provides similar functionality to what a closed circuit camera system would provide, except it does so by using an existing mobile communications infrastructure. It is also much more flexible than any existing closed circuit camera system. Therefore, it can be used both by professionals, such as security services, as well as by non-professionals, such as a group of campers interested to secure their camp site for the weekend or parents wanting to monitor a child.

Although the present invention has been described in detail, those skilled in the art should understand that they can make various changes, substitutions and alterations herein without departing from the spirit and scope of the invention in its broadest form.

What is claimed is:

1. A method for using mobile communications devices for monitoring purposes, comprising:
    causing a first mobile communications device to remotely configure a second mobile communications device by transmitting a control signal directing said second mobile communications device to capture an image with its camera and transmit said image to said first mobile communications device; and
    displaying said image on a screen on said first mobile communications device,
    wherein said control signal directs said second mobile communications device to capture a single image or a video sequence, or to start a continuous capturing process, or for specific on-demand capturing of a single image or video sequence.

2. The method as recited in claim 1 wherein said control signal is transmitted by a mobile message system.

3. The method as recited in claim 2 wherein said mobile message system is an SMS (Short Message Service) system.

4. The method as recited in claim 2 wherein said control signal further directs said second mobile communications device to detect a time interval and to periodically capture and transmit an image at said time interval.

5. The method as recited in claim 1 wherein said control signal includes at least one parameter for configuring said second mobile communications device.

6. The method as recited in claim 1 wherein said control signal is a trigger signal and said second mobile communications device captures an image in response to said trigger signal.

7. The method as recited in claim 1 wherein transmitting said image is via a transmission medium selected from e-mail, multimedia message according to MMS (Multimedia Messaging System) standards and a video stream.

8. The method as recited in claim 1 further comprising compressing said image.

9. The method as recited in claim 1 wherein said control signal includes an identification code.

10. The method as recited in claim 9, wherein said identification code is a telephone number of a cellular telephone.

11. The method as recited in claim 1 further comprising said second mobile communications device capturing audio data and transmitting said audio data to said first mobile communications device.

12. The method as recited in claim 1 further comprising said second communications device detecting movement in the field of view of its camera and capturing an image in response to said movement.

13. The method as recited in claim 1, wherein said first mobile communications device and said second mobile communications device are cellular telephones.

14. The method as recited in claim 1, wherein said first mobile communications device transmits said control signal via a cellular communication network.

15. A monitoring system utilizing mobile communication devices, comprising:
    a first mobile communications device having a means for transmitting a control signal; and
    a second mobile communications device having a means to receive said control signal and a camera for capturing an image in response to said control signal, said second mobile communications device transmitting said image to said first communications device,
    wherein said first communications device, by transmitting said control signal, remotely configures said second communications device, and wherein said control signal directs said second mobile communications device to capture a single image or a video sequence, or to start a continuous capturing process, or for specific on-demand capturing of a single image or video sequence.

16. The monitoring system as recited in claim 15 wherein said means for receiving control signals is adapted to receive control signals by means of a mobile messaging system.

17. The monitoring system as recited in claim 16 wherein said mobile messaging system is an SMS system.

18. The monitoring system as recited in claim 15 wherein said control signal is a trigger signal and said image constitutes either a single image or a video sequence transmitted in response to said trigger signal.

19. The monitoring system as recited in claim 15 wherein said control signal constitutes control parameters for said second mobile communications device system to automatically capture and transmit a single image or a video sequence.

20. The monitoring system as recited in claim 15 wherein said second mobile communications device is configured to detect movement in the field of view of its camera and to automatically capture and transmit a single image or a video sequence to said first communications device.

21. The monitoring system as recited in claim 15 further comprising a microphone associated with said second mobile communications device, said microphone capturing audio data for transmission to said first mobile communications device.

22. The monitoring system as recited in claim 15 wherein said image is transmitted via an e-mail or via a multimedia message in accordance with MMS (Multimedia Messaging System) standards.

23. A first mobile communications device adapted to control a second mobile communications device, comprising:
    a controller for generating control signals;
    a transmitter for transmitting said control signals to said second mobile communications device to remotely configure said second communications device;
    a receiver for receiving an image captured by said second mobile communication device; and
    a display for displaying said image,
    wherein said control signal directs said second mobile communications device to capture a single image or a video sequence, or to start a continuous capturing process, or for specific on-demand capturing of a single image or video sequence.

24. A first mobile communications device as recited in claim 23 wherein said controller is adapted to generate a trigger signal to trigger the capture of an image by said second mobile communications device.

25. A first mobile communications device as recited in claim 23 wherein said controller is adapted to generate at least one configuration parameter for configuring said second mobile communications device.

26. A first mobile communications device as recited in claim 23 further comprising a means for receiving and outputting audio data captured by said second mobile communication device.

27. A first mobile communications device as recited in claim 23 wherein said first mobile communications device is adapted to transmit said control signals by a mobile messaging system.

28. A first mobile communications device as recited in claim 23 wherein said image is received via an e-mail, multimedia message service or a video stream.

29. A non-transitory digital storage medium, comprising: electronically readable control instructions for controlling a controlled mobile communications device, said control instructions causing said controlled mobile communications device to: capture an image in response to a control signal from a controlling mobile communications device, wherein said controlling mobile communications device configures said controlled mobile communications device to capture an image with its camera and transmit said image to said first mobile communications device; and transmit said image to said controlling mobile communications device wherein said control signal directs said second mobile communications device to capture a single image or a video sequence, or to start a continuous capturing process, or for specific on demand capturing of a single image or video sequence.

30. A non-transitory digital storage medium as recited in claim 29 wherein said digital storage medium is a microchip.

31. A non-transitory digital storage medium, comprising: electronically readable control instructions for controlling a first mobile communications device, said control instructions directing said first mobile communications device to: transmit control signals to a second mobile communication device wherein said first mobile communications device configures said controlled mobile communications device to capture an image with its camera and transmit said image to said first mobile communications device, and wherein said control signal directs said second mobile communications device to capture a single image or a video sequence, or to start a continuous capturing process, or for specific on-demand capturing of a single image or video sequence; and receive and display an image captured by said second mobile communication device.

32. A non-transitory digital storage medium as recited in claim 31 wherein said digital storage medium is a microchip.

* * * * *